(12) United States Patent
Ladouceur et al.

(10) Patent No.: US 7,106,306 B2
(45) Date of Patent: *Sep. 12, 2006

(54) KEYBOARD ASSEMBLY OPTIMIZED FOR A MOBILE DEVICE

(75) Inventors: Norman M. Ladouceur, Waterloo (CA); Jason T. Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/122,674

(22) Filed: May 5, 2005

(65) Prior Publication Data

US 2005/0205404 A1    Sep. 22, 2005

Related U.S. Application Data

(63) Continuation of application No. 10/302,242, filed on Nov. 21, 2002, now Pat. No. 6,891,529.

(60) Provisional application No. 60/331,999, filed on Nov. 23, 2001.

(51) Int. Cl.
*H01H 3/40* (2006.01)
*G09G 5/00* (2006.01)

(52) U.S. Cl. .................. 345/168; 200/500

(58) Field of Classification Search ........ 345/168–170; 341/20, 22, 26; 200/5 A, 5 R
See application file for complete search history.

(56) References Cited

U.S. PATENT DOCUMENTS

| 5,197,178 | A | 3/1993 | Lichte et al. |
|---|---|---|---|
| 5,329,278 | A | 7/1994 | Dombroski |
| 5,973,621 | A | 10/1999 | Levy |
| 6,150,962 | A | 11/2000 | Rossmann |
| 6,621,484 | B1 | 9/2003 | Yee |
| 2001/0038382 | A1 | 11/2001 | Griffin et al. |
| 2003/0020692 | A1 | 1/2003 | Griffin |

*Primary Examiner*—Kee M. Tung
*Assistant Examiner*—Eric Woods
(74) *Attorney, Agent, or Firm*—Jones Day; Krishna K. Pathiyal; Robert C. Liang

(57) ABSTRACT

A keyboard assembly for a mobile device is provided that reduces the separation between keys by reducing the number of required dome switches. A reduction in the number of dome switches can alternatively reduce the amount of real estate taken up by dome switches on a printed circuit board (PCB). Fewer dome switches than keys are provided on a PCB to activate a desired functionality when a key is depressed. The dome switches are each actuatable by and disposed between more than one key, such keys preferably being adjacent keys. Each key has an actuator with at least one arm for actuating a dome switch in an actuated dome switch pattern when the key is depressed. Such a keyboard assembly can be used for any electronic device having a standard QWERTY or Dvorak keyboard layout, a standard telephone or numeric keypad layout, or any other layout of keys.

12 Claims, 5 Drawing Sheets

KEYBOARD ASSEMBLY OPTIMIZED FOR A MOBILE DEVICE

CROSS-REFERENCE TO RELATED APPLICATIONS

This application is a continuation of U.S. patent application Ser. No. 10/302,242 filed on Nov. 21, 2002 now U.S. Pat. No. 6,891,529 entitled "Keyboard Assembly For A Mobile Device," which claims the benefit of priority from U.S. patent application Ser. No. 60/331,999 filed on Nov. 23, 2001. These prior applications, including the entire written descriptions and drawing figures, are hereby incorporated into the present application by reference.

FIELD OF THE INVENTION

The present invention relates to the field of keyboards and keypads for electronic devices, in particular for mobile devices.

BACKGROUND OF THE INVENTION

Many mobile devices, such as cellular telephones, personal digital assistants (PDAs), and other handheld computing and communicating devices, advantageously employ a keyboard or keypad as a means of inputting data into the device.

Existing keyboards or keypads for small handheld devices often include a standard 12-key telephone keypad. Typing text using such a keypad requires the user to input data in an unfamiliar manner. Other kinds of keyboards follow the standard Dvorak keyboard layout or, more commonly, the QWERTY keyboard layout and are used in portable handheld devices such as the RIM 950 Wireless Handheld™. This kind of keyboard, when adapted to a mobile device, uses a plurality of small individual keys optimised for operation with the thumbs of the user.

However, such a keyboard has considerably more keys than a standard telephone keypad and the larger number of individual keys requires more space on a printed circuit board (PCB) than a keypad. Each key requires its own footprint and switch, such as a dome switch, on the PCB that activates a function or input when a key is depressed. Because of the relatively small size of such handheld devices, PCB space is limited and a QWERTY or Dvorak type keyboard takes up valuable real estate on the PCB. Keyboard size is limited by the distance between the dome switches, which have a minimum distance between them. The cost of dome switches is not insignificant when a keyboard includes a large number of keys. It is therefore desirable to provide an improved keyboard assembly for an electronic device.

SUMMARY OF THE INVENTION

It is an object of the present invention to obviate or mitigate at least one disadvantage of previous keyboard assemblies for electronic devices, particularly those provided for use with mobile devices.

In one aspect of the invention, a keyboard assembly having a plurality of keys and a plurality of dome switches, less in number than the keys, is arranged so as to reduce the separation between the keys. A reduction in the number of required dome switches can alternatively reduce the amount of real estate taken up by dome switches on a printed circuit board.

According to an aspect of the present invention, there is provided a keyboard assembly for an electronic device having a printed circuit board. The keyboard assembly comprises a plurality of dome switches disposed on the printed circuit board, and a plurality of keys, greater in number than the plurality of dome switches. Each key is for actuating at least one of the dome switches in an actuated dome switch pattern, the actuated dome switch pattern determining an actuated key. At least one of the keys is for actuating more than one of the dome switches.

In a presently preferred embodiment, the electronic device is a mobile device.

The keyboard assembly can further comprise a plurality of actuators. Each of the actuators is associated with one of the keys. Each actuator is for actuating a dome switch in response to depression of one of the keys. An actuator can have at least two arms, each arm for actuating a different dome switch in the actuated dome switch pattern. An actuator can also include an arm for maintaining the balance of a key when it is depressed.

The keys can be arranged in rows and the dome switches can be arranged in rows between the rows of keys such that each of the dome switches is positioned between two adjacent keys in a row, and preferably between four diagonally adjacent keys disposed in two adjacent rows. Each of the dome switches is actuatable by more than one of the keys, preferably by four diagonally adjacent keys. Each of the actuators can be moulded as part of its associated key.

A switch activation force is applied to a switch in response to a key activation force in order to activate the switch. The key activation force can be mechanically or electrically controlled or regulated, by a suitable control means, independently of the switch activation force. As such, a regulated key activation force can be used to ensure a common activation force for any key activation.

According to another aspect of the present invention, there is provided a mobile device having a memory and a printed circuit board. The mobile device has a keyboard assembly, which comprises a plurality of dome switches disposed on the printed circuit board, and a plurality of keys, greater in number than the plurality of dome switches. The keys are arranged in a key configuration, each key for actuating at least one of the dome switches in an actuated dome switch pattern in response to depression of the key, the actuated dome switch pattern determining an actuated key. At least one of the keys is for actuating more than one of the dome switches. The mobile device also includes an operating system stored in the memory, the operating system determining the actuated key based on the actuated dome switch pattern. The mobile device further includes an interface for communication between the keyboard assembly and the operating system.

The mobile device can have different key configurations, such as: a QWERTY keyboard configuration; a Dvorak keyboard configuration; or a standard telephone keypad configuration.

According to a further aspect of the invention, there is provided a keyboard assembly for a mobile device having a printed circuit board. The keyboard assembly comprises a plurality of keys arranged in rows in a key configuration, and a plurality of dome switches, less in number than the plurality of keys. The dome switches are disposed on the printed circuit board and arranged in rows between the rows of keys such that each of the dome switches is positioned between two adjacent keys in a row. The keyboard assembly also comprises a plurality of actuators each associated with one of the keys. At least one of the actuators has at least two arms, each arm for actuating a different dome switch in an actuated dome switch pattern in response to depression of an actuated key.

In the keyboard assembly described above, the actuated dome switch pattern can correspond uniquely to a particular key depression. A particular actuator can include an arm for maintaining the balance of a key when it is depressed. Each of the dome switches can be positioned between four diagonally adjacent keys disposed in two adjacent rows. Each of the dome switches can be actuatable by more than one of the keys, preferably by four diagonally adjacent keys. Each of the actuators can be moulded as part of its associated key.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Generally, the present invention provides a keyboard assembly for a mobile device that reduces the separation between keys by reducing the number of required dome switches. A reduction in the number of dome switches can alternatively reduce the amount of real estate taken up by dome switches on a printed circuit board (PCB). Fewer dome switches than keys are provided on a PCB to activate a desired functionality when a key is depressed. The dome switches are each actuatable by and disposed between more than one key, such keys preferably being adjacent keys. Each key has an actuator with at least one arm for actuating a dome switch in an actuated dome switch pattern when the key is depressed. Such a keyboard assembly can be used for any electronic device having a standard QWERTY or Dvorak keyboard layout, a standard telephone or numeric keypad layout, or any other layout of keys.

Figure 1:
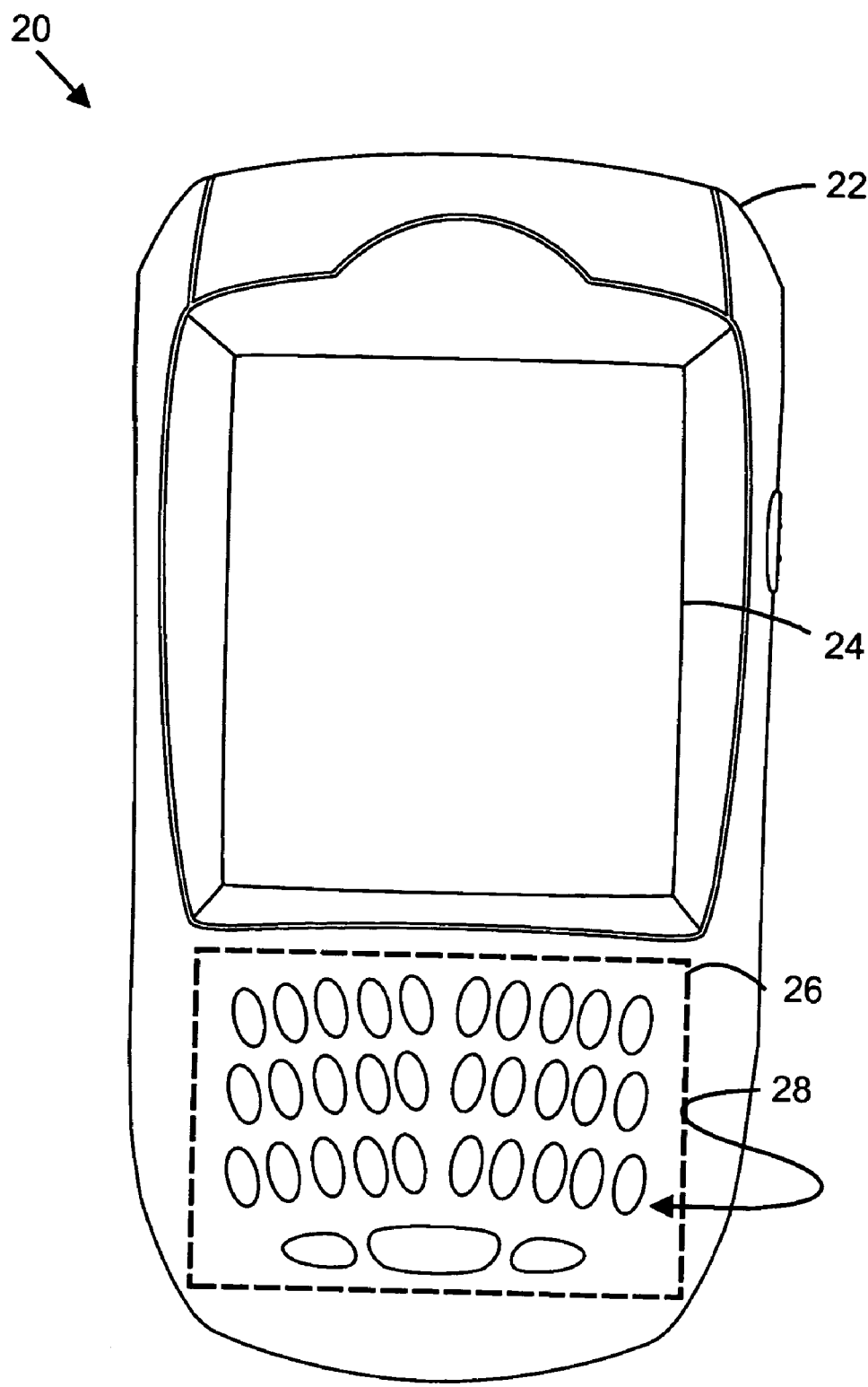
FIG. 1 illustrates a front elevation of a mobile device having a keyboard.

FIG. 1 illustrates a front elevation of an electronic device having a keyboard. Keyboard assemblies according to embodiments of the present invention can be used with, and incorporated in, such an electronic device 20. Although the device 20 shown in FIG. 1 is a mobile electronic device having a keyboard, aspects of the present invention can be advantageously incorporated in any type of electronic device having any type of key configuration. The term key configuration is used herein to represent any configuration of keyboard or keypad, including but not limited to: QWERTY keyboard layout; Dvorak keyboard layout; standard telephone keypad layout; and any other configuration incorporating one of these layouts or portions thereof. Similarly, the term keyboard as used herein generally refers to any plurality of keys arranged in a keyboard or keypad configuration or layout.

The device 20 typically has a housing 22, a display 24, such as a liquid crystal display (LCD), and a keyboard area having a keyboard 26 arranged in a key configuration. The keyboard 26 is typically situated adjacent to the display 24 and preferably below the display. The keyboard comprises a plurality of keys 28 arranged in a key configuration. These keys can typically be positioned to form a QWERTY keyboard or a Dvorak keyboard.

Figure 2:
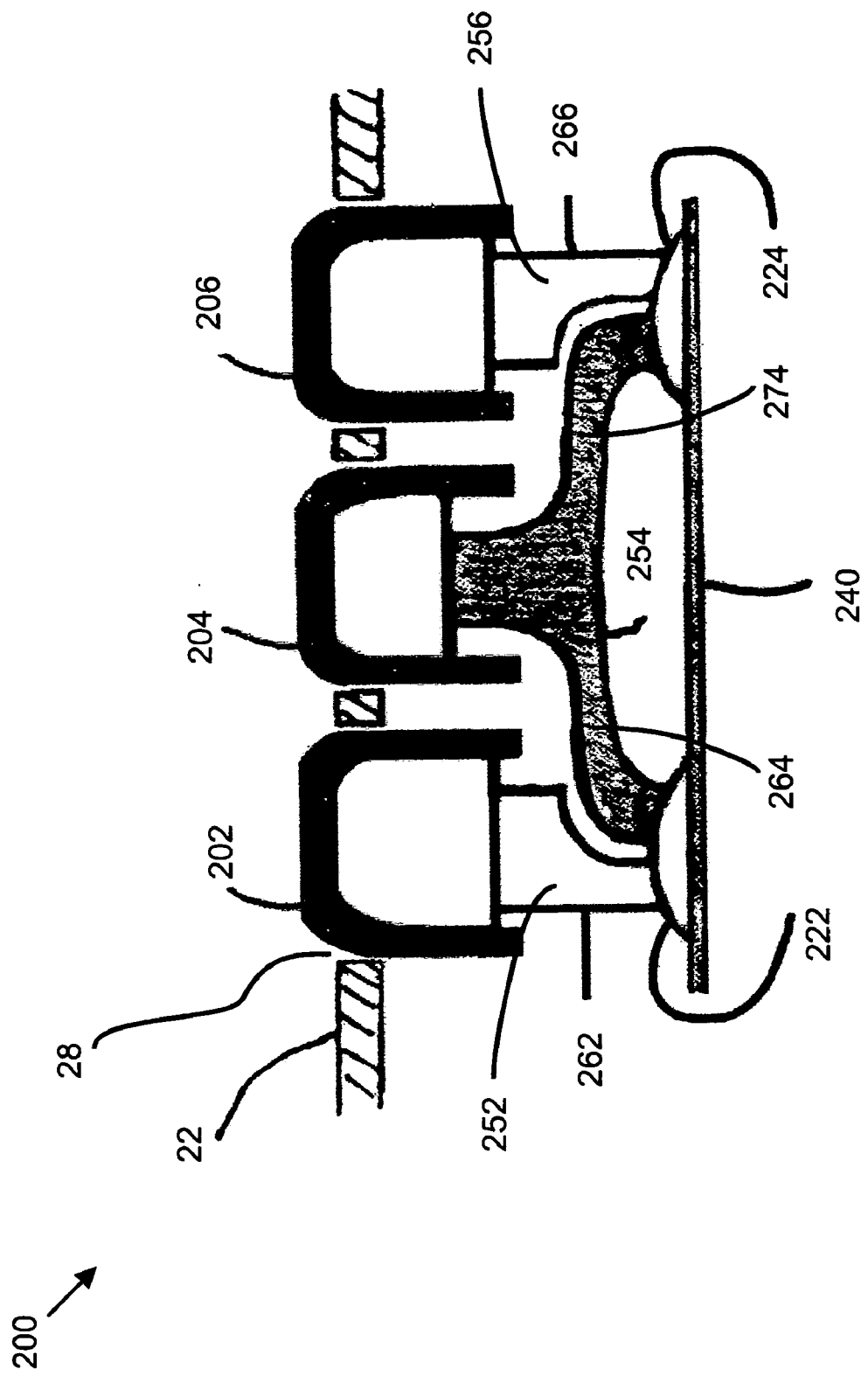
FIG. 2 illustrates a side view of a keyboard assembly according to a first embodiment of the present invention.

FIG. 2 illustrates a side view of a keyboard assembly 200 according to a first embodiment of the present invention. The term keyboard assembly is used herein to describe the collection of physical components that together allow a device to accept user inputs via a plurality of keys. These physical components can include, but are not limited to: keys, actuators, dome switches, and a printed circuit board.

Keys 202, 204 and 206 preferably protrude through openings 28 in the device housing 22. Although only three keys are shown in FIG. 2 for simplicity of illustration and explanation, it will be apparent to one skilled in the art that a keyboard can include many more such keys. Each key actuates an input or function when a user depresses the key, thereby depressing at least one dome switch 222, 224, each of which is disposed on a printed circuit board (PCB) 240. Conventionally, each key is associated with an individual dome switch. According to the present invention, each key is associated with one or more dome switches, and each dome switch is associated with one or more keys. In the embodiment illustrated in FIG. 2, two dome switches 222 and 224 are associated with three adjacent keys 202, 204 and 206.

Typically, each key in a keyboard for an electronic device has an actuator, or post, underneath the key. The actuator engages or actuates a dome switch. Each actuator has at least one arm for actuating a dome switch in response to depression of a key. In this embodiment, keys 202, 204 and 206 preferably have actuators 252, 254, 256 respectively associated therewith. Each of the actuators 252, 254 and 256 has at least one arm that actuates one or more of the dome switches 222, 224. For instance, when the key 202 is depressed, the actuator 252 actuates the dome switch 222 via arm 262. When the key 204 is depressed, the actuator 254 actuates both the dome switches 222 and 224 via arms 264 and 274, respectively. When the key 206 is depressed, the actuator 256 actuates the dome switch 224 via arm 266.

It can therefore be seen that depressing a particular key results in an actuated dome switch pattern. The actuated dome switch pattern comprises an identification of the dome switches that are actuated in response to depressing a particular key. This actuated dome switch pattern is not a temporal or sequential pattern of dome switch actuation; rather, it comprises a pattern of dome switches that are actuated simultaneously, substantially at the same time, or within a predetermined window of time. Based on the actuated dome switch pattern, it can be determined which key is actuated. Each dome switch pattern preferably corresponds uniquely to a particular key depression.

In relation to FIG. 2, a dome switch pattern where only the dome switch 222 is actuated is caused by depression of the key 202, which depresses the arm 262 of the actuator 252. Similarly, a dome switch pattern where both the dome switches 222 and 224 are actuated is caused by depression of the key 204, which depresses the arms 264 and 274 of the actuator 254. Finally, a dome switch pattern where only the dome switch 224 is actuated is caused by depression of the key 206, which depresses the arm 266 of the actuator 256.

When a keyboard assembly such as the one illustrated in FIG. 2 is used in an electronic device, such as a mobile device, the device typically has an operating system stored in its memory. When a key is depressed, the resulting actuated dome switch pattern is recognized by the device's operating system as being uniquely associated with depression of a particular key. This can be accomplished, for example, by storing in memory information regarding each possible key depression and its corresponding actuated dome switch pattern. This can be advantageously be stored in a type of lookup table in the device's memory, or can be alternatively accomplished by any other equivalent means.

A keyboard assembly such as the one described above allows the keys that protrude from the device housing to be spaced closer together than with conventional keyboard arrangements. In this example, the spacing is determined according to the distance required for three keys to be able to engage two dome switches on the PCB. Alternatively, the present invention results in less real estate on the PCB being devoted to the dome switches, thus making space for other components. Of course, these concepts can be expanded to a plurality of such key and dome switch combinations, in various rows of keys. Examples of such combinations will be discussed in relation to further embodiments of the invention discussed below. In an alternative embodiment, each of the actuators can be moulded as part of the key. The keys can be made of plastic and can be set in a plastic web. The actuators can be made of plastic.

A switch activation force is applied to a switch in response to a key activation force in order to activate the switch. The key activation force can be mechanically or electrically controlled or regulated, by a suitable control means, independently of the switch activation force. As such, a regulated key activation force can be used to ensure a common activation force for any key activation.

Figure 3:
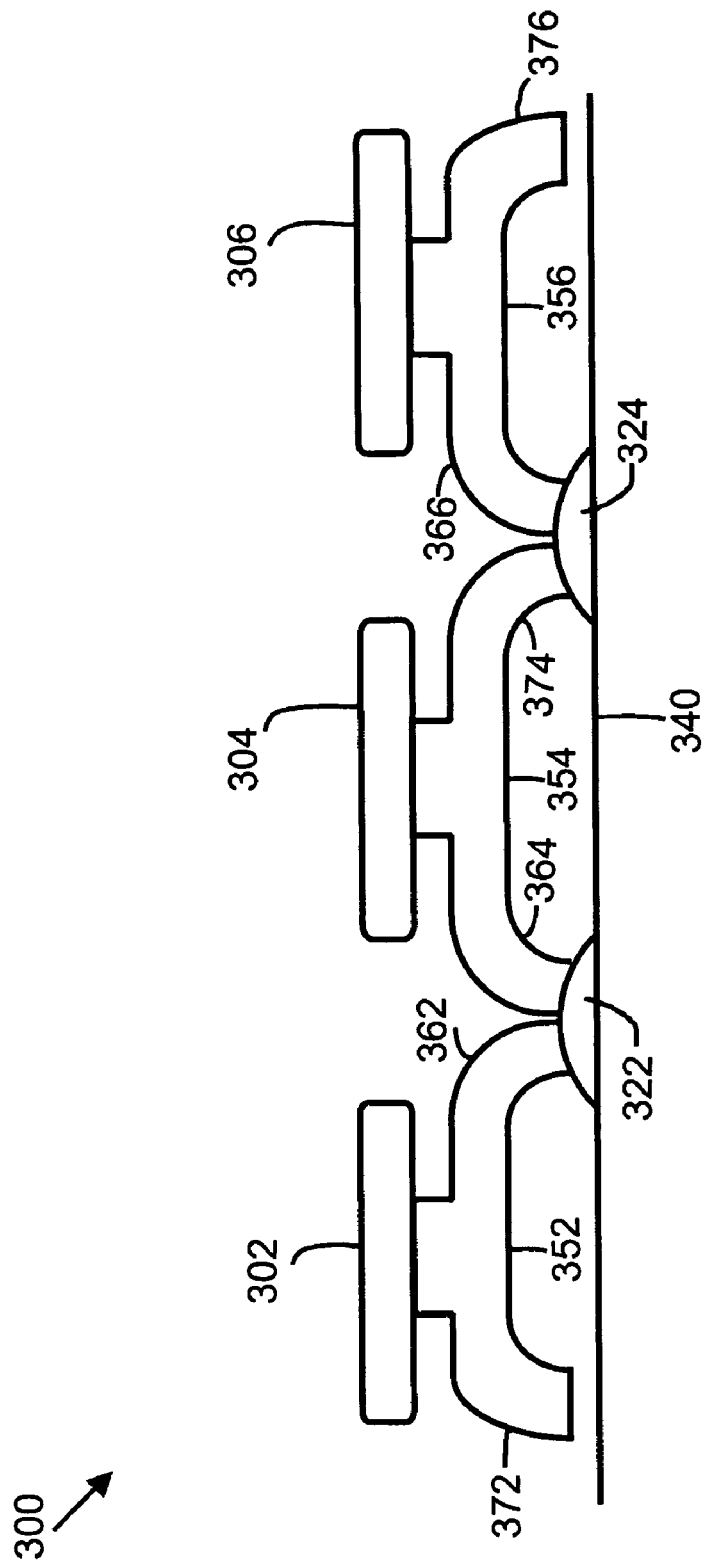
FIG. 3 illustrates a side view of a keyboard assembly according to a second embodiment of the present invention.

FIG. 3 illustrates a side view of a keyboard assembly 300 according to a second embodiment of the present invention. The embodiment in FIG. 3 is similar to that illustrated in FIG. 2 in the layout of keys 302, 304, 306 and of dome switches 322 and 324 on PCB 340. The embodiment in FIG. 3 provides for a different design of an actuator used in conjunction with an end key, i.e. a key that is at an end of a row of keys. Actuators 352 and 356 in FIG. 3, in addition to having arms 362 and 366 for actuating the dome switches 322 and 324, respectively, also have arms 372 and 376. Each of the arms 372 and 376 does not engage a dome switch, but maintains the balance of the key when it is depressed. Any of the actuators 352, 354 and 356 can alternatively comprise one or more additional arms for actuating further dome switches on adjacent horizontal or vertical rows. Any of these actuators can further alternatively comprise one or more additional arms that does not engage a dome switch, but maintains the balance of the key when it is depressed.

Figure 4:
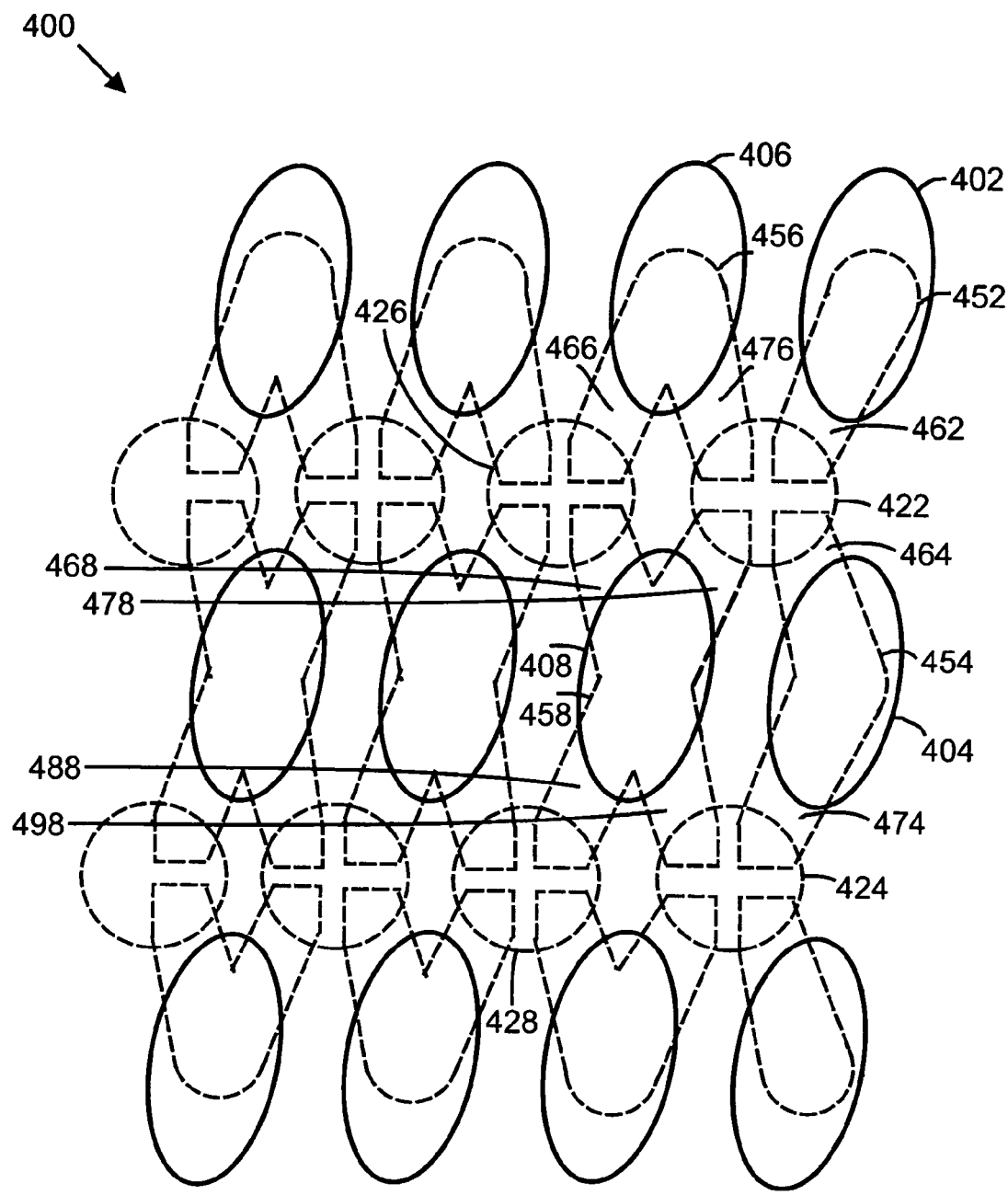
FIG. 4 illustrates a top view of a keyboard assembly according to a third embodiment of the present invention with different layers shown in dashed lines.

FIG. 4 illustrates a top view of a keyboard assembly 400 according to a third embodiment of the present invention with different layers shown in dashed lines. In this embodiment, keys are laid out in rows and dome switches are laid out in rows between the rows of keys such that the dome switches are positioned between two adjacent keys in a row. A dome switch is then preferably associated with four diagonally adjacent keys. Although a PCB is not illustrated in FIG. 4, it is to be understood that the keyboard arrangement 400 includes a PCB on which the dome switches are disposed. Although actuators and dome switches are both illustrated in dashed lines, it is to be understood that these two sets of elements are themselves on different layers, each different from the key layer. Three different types of key and actuator arrangements will now be described in relation to the embodiment illustrated in FIG. 4.

A key 402 in a top right corner of the keyboard assembly 400 is arranged so as to actuate only one dome switch when it is depressed. The key 402 preferably has an actuator 452 having an arm 462 that extends diagonally from the key. The arm 462 actuates an adjacent dome switch 422 when the key 402 is depressed. A key and actuator pair at the bottom right corner of the keyboard assembly 400 has a similar structure to the key 402 and the actuator 452. An actuator associated with such a key can alternatively comprise one or more additional arms that do not engage a dome switch, but maintain the balance of the key when it is depressed.

An edge key 454 being at an outer edge of a key configuration preferably has an actuator 454 having two arms 464 and 474 for actuating two diagonally adjacent dome switches 422 and 424, situated above and below the key 404, when the key 404 is depressed. Similarly, a key 406 in the top row preferably has an actuator 456 having two arms 466 and 476 for actuating two diagonally adjacent dome switches 422 and 426, situated below the key 406, when the key 406 is depressed. Other key and actuator pairs in the top and bottom rows have a similar structure to the key 406 and the actuator 456 for actuating two diagonally adjacent dome switches in a row either above or below the key. This includes the key and actuator pairs in the top left and bottom left corners of the keyboard assembly 400. Also, an actuator associated with such a key can alternatively comprise one or more additional arms that do not engage a dome switch, but maintain the balance of the key when it is depressed.

A key 408 in a middle row preferably has an actuator 458. The actuator 458 has four arms 468, 478, 488 and 498 for actuating four diagonally adjacent dome switches 422, 424, 426 and 428, above and below the key 408. Other key and actuator pairs in any row that is not a top or bottom row can have a similar structure to the key 408 and the actuator 458. This includes a key and actuator pair at the left edge, or end, of the middle row of FIG. 4, and applies to any other such middle row that may be present in a key configuration. Actuators are preferably made from plastic and can be moulded within the shape of the key.

With particular reference to FIG. 4, an actuated dome switch pattern where only the dome switch 422 is actuated is interpreted as being a result of the key 402 being depressed. An actuated dome switch pattern where the dome switches 422 and 424 are actuated is interpreted as being a result of the key 404 being depressed. An actuated dome switch pattern where the dome switches 422 and 426 are actuated is interpreted as being a result of the key 406 being depressed. Also, an actuated dome switch pattern where the dome switches 422, 424, 426 and 428 are actuated is interpreted as being a result of the key 408 being depressed. The operating system is able to interpret other actuated dome switch patterns as preferably being uniquely the result of a particular key being depressed.

The keyboard assemblies in the embodiments discussed above are not limited to mobile devices. These types of keyboard assemblies can be implemented in any electronic device that requires a QWERTY or Dvorak keyboard, or any similar keyboard configuration. Some examples include personal computer (PC) keyboards and label makers.

Figure 5:
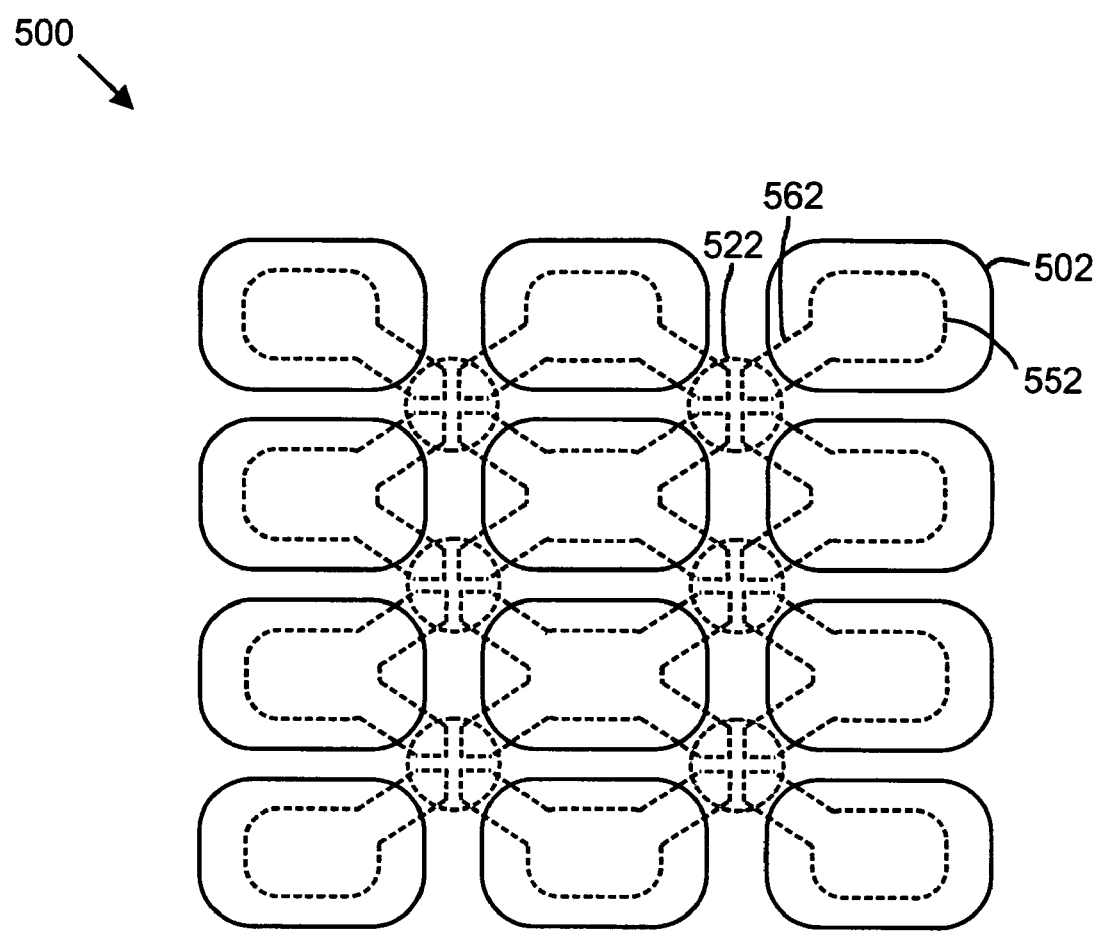
FIG. 5 illustrates a top view of a keyboard assembly according to a fourth embodiment of the present invention with different layers shown in dashed lines.

FIG. 5 illustrates a top view of a keyboard assembly 500 according to a fourth embodiment of the present invention with different layers shown in dashed lines. FIG. 5 is an embodiment that is particularly suited for use with a key configuration such as a numeric keypad, or a standard telephone keypad. Although a PCB is not illustrated in FIG. 5, it is to be understood that the keyboard assembly 500 includes a PCB on which the dome switches are disposed. Although actuators and dome switches are both illustrated in dashed lines, it is to be understood that these two sets of elements are themselves on different layers, each different from the key layer.

In FIG. 5, the key configuration has less dome switches than keys, since each dome switch is associated with more than one key. As in FIG. 4, in this embodiment, preferably each dome switch is associated with four different keys. In this embodiment, an actuator actuates at least one and at most four dome switches in a similar manner as in FIG. 4. An exemplary key 502 has an actuator 552 that has at least one arm 562 for actuating a dome switch 522. Different types of key and actuator pairs, as discussed in relation to FIG. 4, are similarly present in the embodiment shown in FIG. 5.

An electronic device incorporating a keyboard assembly such as illustrated in FIG. 3, FIG.4 or FIG. 5 preferably has an operating system stored in memory. When a key is depressed, the resulting actuated dome switch pattern is recognized by the device's operating system as preferably being uniquely associated with depression of a particular key. This can be accomplished, for example, by storing in memory information regarding each possible key depression and its corresponding actuated dome switch pattern. This can advantageously be stored in a type of lookup table in the device's memory, or can be alternatively accomplished by any other equivalent means.

A key configuration such as the one illustrated in FIG. 5 is not limited to use in mobile devices, but could be used in any electronic device that requires a numeric keypad. Some examples of such devices include mobile phones, standard telephones, calculators, and alarm systems.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A keyboard assembly for an electronic device having a printed circuit board, comprising:
   a plurality of dome switches disposed on the printed circuit board; and
   a plurality of keys, greater in number than the plurality of dome switches, each key for actuating at least one of the plurality of dome switches in an actuated dome switch pattern, the actuated dome switch pattern determining an actuated key, and at least one of the plurality of keys for actuating more than one of the plurality of dome switches simultaneously; and
   a plurality of actuators, each of the plurality of actuators associated with one of the plurality of keys for actuating one of the plurality of dome switches in response to depression of the one of the plurality of keys;
   wherein a particular actuator includes an arm for maintaining the balance of a key when it is depressed.

2. A keyboard assembly according to claim 1 wherein the electronic device is a mobile device.

3. A keyboard assembly according to claim 1 wherein at least one of the plurality of actuators has at least two arms, each arm for actuating a different one of the plurality of dome switches in the actuated dome switch pattern.

4. A keyboard assembly according to claim 1 wherein the plurality of keys are arranged in rows and the plurality of dome switches are arranged in rows between the rows of keys such that each of the plurality of dome switches is positioned between two adjacent keys in a row.

5. A keyboard assembly according to claim 1 wherein each of the plurality of dome switches is positioned between four diagonally adjacent keys disposed in two adjacent rows.

6. A keyboard assembly according to claim 1 wherein each of the plurality of dome switches is actuatable by more than one of the plurality of keys.

7. A keyboard assembly according to claim 1 wherein each of the plurality of dome switches is actuatable by four diagonally adjacent keys.

8. A keyboard assembly according to claim 1 wherein each of the plurality of actuators is moulded as part of its associated key.

9. A mobile device having a memory and a printed circuit board, comprising:
   a keyboard assembly including:
      a plurality of dome switches disposed on the printed circuit board;
      a plurality of keys, greater in number than the plurality of dome switches, arranged in a key configuration, each key for actuating at least one of the plurality of dome switches in an actuated dome switch pattern in response to depression of the key, the actuated dome switch pattern determining an actuated key, and at least one of the plurality of keys for actuating more than one of the plurality of dome switches simultaneous;
      a plurality of actuators, each of the plurality of actuators associated with one of the plurality of keys for actuating one of the plurality of dome switches in response to depression of the one of the plurality of keys, wherein a particular actuator includes an arm for maintaining the balance of a key when it is depressed;
   an operating system stored in the memory, the operating system determining the actuated key based on the actuated dome switch pattern; and
   an interface for communication between the keyboard assembly and the operating system.

10. A mobile device according to claim 9 wherein the key configuration comprises a QWERTY keyboard configuration.

11. A mobile device according to claim 9 wherein the key configuration comprises a Dvorak keyboard configuration.

12. A mobile device according to claim 9 wherein the key configuration comprises a standard telephone keypad configuration.

* * * * *